United States Patent
Oteki et al.

(10) Patent No.: US 7,272,737 B2
(45) Date of Patent: *Sep. 18, 2007

(54) IMAGE PROCESSING DEVICE, METHOD FOR SAVING POWER CONSUMPTION OF THE IMAGE PROCESSING DEVICE, AND A COMPUTER PRODUCT

(75) Inventors: Sugitaka Oteki, Tokyo (JP); Yuji Takahashi, Kanagawa (JP); Yoshiyuki Namizuka, Kanagawa (JP); Hideto Miyazaki, Kanagawa (JP); Yasuyuki Nomizu, Kanagawa (JP); Hiroyuki Kawamoto, Kanagawa (JP); Rie Ishii, Tokyo (JP); Takeharu Tone, Tokyo (JP); Hiroaki Fukuda, Kanagawa (JP); Shinya Miyazaki, Tokyo (JP); Fumio Yoshizawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 256 days.

This patent is subject to a terminal disclaimer.

(21) Appl. No.: 10/887,890

(22) Filed: Jul. 12, 2004

(65) Prior Publication Data

US 2004/0255175 A1    Dec. 16, 2004

Related U.S. Application Data

(63) Continuation of application No. 09/706,781, filed on Nov. 7, 2000, now Pat. No. 6,763,473.

(30) Foreign Application Priority Data

Nov. 17, 1999  (JP)  ............... 11-327494

(51) Int. Cl.
G06F 1/32  (2006.01)
(52) U.S. Cl. ............... 713/324; 713/320; 713/323
(58) Field of Classification Search ............... 713/324, 713/323
See application file for complete search history.

(56) References Cited

U.S. PATENT DOCUMENTS

| 5,050,221 | A | | 9/1991 | Ohta et al. |
| 5,862,437 | A | | 1/1999 | Kutsuwada et al. |
| 5,867,720 | A | * | 2/1999 | Hirano ............... 713/324 |
| 5,978,923 | A | | 11/1999 | Kou |
| 6,041,139 | A | | 3/2000 | Okubo et al. |
| 6,088,806 | A | | 7/2000 | Chee |
| 6,314,523 | B1 | | 11/2001 | Voltz |
| 6,763,473 | B1 | * | 7/2004 | Oteki et al. ............... 713/324 |

FOREIGN PATENT DOCUMENTS

JP   9-186836   7/1997

\* cited by examiner

*Primary Examiner*—Dennis M. Butler
(74) *Attorney, Agent, or Firm*—Oblon, Spivak, McCLelland, Maier & Neustadt, P.C.

(57) ABSTRACT

The image processing device comprises a first function block section formed of functional blocks which require a supply of power so as to maintain the image processing device in an operating state when the power supply is on, and a second function block section formed of functional blocks which need not be supplied with the power so as to maintain the image processing device in an operating state even when the power supply is on. The supply of power to the second function block section can be stopped when desired, while continuing the supply of power to the first function block section, thereby saving the power.

24 Claims, 14 Drawing Sheets

IMAGE PROCESSING DEVICE, METHOD FOR SAVING POWER CONSUMPTION OF THE IMAGE PROCESSING DEVICE, AND A COMPUTER PRODUCT

CROSS-REFERENCE TO RELATED APPLICATIONS

The present application is a Continuation of U.S. application Ser. No. 09/706,781, filed on Nov. 7, 2000, now U.S. Pat. No. 6,763,473, and in turn claims priority to JP 11-327494 filed on Nov. 17, 1999, the entire contents of each of which are hereby incorporated herein by reference.

FIELD OF THE INVENTION

The present invention in general relates to a technique for saving the power of an image processing device. In particular, the present invention relates to an image processing device, such as a digital copying machine, or an MFP (Multi-function Printer), which forms an image based on the image data. This invention also relates to method for saving the power consumption of the image processing device and to a computer readable recording medium that stores a computer program which realizes the method according to the present invention on a computer.

BACKGROUND OF THE INVENTION

A conventional digital copying machines is disclosed, for example, in Japanese Patent Application Laid-Open No. 9-186836. This digital copying machine picks-up an image of a manuscript, converts the picked up image into image data, and stores the image data of one page or a plurality of pages in an auxiliary storage device such as a floppy disk device or a hard disk device. The image data in the auxiliary storage device is then transferred to a frame memory. The image data in the frame memory is then sent to a printer engine page by page. Accordingly, the image of the manuscript is reproduced.

A control system of this digital copying machine has a configuration as shown in FIG. 14. This control system includes two CPUs, i.e., CPU 1 and CPU 2 for controlling the whole digital copying machine, a main storage memory 3 for storing application programs to be executed by these CPUs and font data required when printing the image of the manuscript, and a CPU bus 30 for connecting the CPU 1, CPU 2, and the main storage memory 3 to each other. The application programs and font data are read out from an auxiliary storage device 21 and stored in the main storage memory 3.

The CPU bus 30 is connected to a PCI bus 31 via a PCI bridge 4, and connected to a PCI bus 32 via a PCI bridge 5. The CPU bus 30 is also connected to a PCI bus controller 6 to which the PCI bridge 4 and the PCI bridge 5 are connected.

The PCI bus controller 6 conducts arbitration between the PCI bus 31 supported by the PCI bridge 4 and the PCI bus 32 supported by the PCI bridge 5 and effecting control corresponding to a PCI bus protocol.

There are connected to the PCI bus 31, a display controller 7 for controlling operation of a display device 10, a touch panel controller 8 for controlling operation of a touch panel 9, an FD/HD interface controller 11 for controlling operation of the auxiliary storage device 21 such as a floppy disk device or a hard disk device, a serial parallel interface controller 12 for conducting serial communication and parallel communication with a host computer which is not illustrated, and a network interface controller 13 for conducting communication with a local area network or the like.

A DRAM controller 14 is also connected to the PCI bus 31. The DRAM controller 14 generates an address for writing and reading image data into/from a frame memory 16, and effects refresh control of a DRAM included in the frame memory 16.

On the other hand, there are connected to the PCI bus 32 a DRAM controller 15, a DMA controller 18, and a SCSI interface 20. The DRAM controller 15 generates an address for writing and reading image data into/from a frame memory 17, and effects refresh control of a DRAM included in the frame memory 17. The DMA controller 18 effects transfer control of image data of DRAMs included in the frame memory 16 and the frame memory 17. The SCSI interface 20 effects connection control to a SCSI bus which is not illustrated.

The DRAM controller 14 is connected to the DMA controller 18 and a video interface 19. The DRAM controller 15 is also connected to the DMA controller 18 and the video interface 19. The DMA controller 18 can transfer image data developed in the frame memory 16 directly to the video interface 19 by using DRAM transfer control, and transfer image data developed in the frame memory 17 directly to the video interface 19 by using DRAM transfer control. Image data transferred to the video interface 19 is transmitted to a printer engine which is not illustrated.

Operation of the conventional digital copying machine having the configuration heretofore described will now be described by referring to the case where the copying machine reads an image of a manuscript extending over a plurality of pages and prints the image of the manuscript. Image data including character codes and control commands inputted from a host computer which is not illustrated via the serial parallel interface controller 12 or inputted from a local area network or the like which is not illustrated via the network interface controller 13 is inputted to the CPU 1 (or CPU 2) via the PCI bus 31, the PCI bridge 4, and the CPU bus 30, decoded by the CPU 1, and developed on, for example, the frame memory 17 as bit map data.

When bit map data of the image corresponding to one page of a manuscript is developed on the frame memory 17, the CPU 1 starts the DMA controller 18, and transfers the bit map data of the image corresponding to one page of the manuscript from the frame memory 17 to the video interface 19. On the basis of the transferred bit map data, a printer engine (not illustrated) prints the image of the read manuscript.

Recently, however, there is a movement on foot to suppress discharge of carbon dioxide to the utmost in order to prevent the warming of the earth. As a part of this movement, various energy saving measures are being taken in various business machines, such as home electric products, personal computers, and OA machines, as well. The degree of demand of energy saving is increasing day by day.

In order to accede to such a demand, a recent digital copying machine recognizes that it has not been used for a long time, automatically comes in a power saving mode, and cuts off power supply of a heater section of a fuser consuming comparatively great power among components of the digital copying machine.

If the degree of the demand of energy saving further increases, however, it is inevitable that even a control device which consumes comparatively small power among the components of the digital copying machine is pressed for the energy saving measure. The control device is not a terminal device unlike the heater section of the fuser, but it is a principal device for controlling the operation of the digital copying machine. Unlike the heater section of the fuser, therefore, the energy saving measure of the control device cannot be finished by merely cutting off the power supply.

For example, in the case of the digital copying machine shown in FIG. 14, function blocks such as various controllers are connected to each other by buses such as the CPU bus 30, the PCI bus 31 and the PCI bus 32. Therefore, it is difficult to cut off the power supply of some function blocks as the energy saving measure, because there is a fear that the function of the digital copying machine itself may stop. For example, in the PCI bus, existence of a PCI card is sensed by inserting the PCI card into a slot. Therefore, it is not possible to cut off the power supply of only some PCI cards on a PCI bus.

As a simple energy saving measure, therefore, it is conceivable to cut off the power supply of all controllers. However, there are function blocks taking charge of functions which must not be stopped such as a FAX function (especially its reception function). Therefore, such an easy-going energy saving measure cannot be adopted.

SUMMARY OF THE INVENTION

It is an object of the present invention to provide such an image processing device that when the image processing device is not used for at least a predetermined time such as when the image processing device is in the stand-by state, power is supplied to only function blocks which need to operate at all times and the power dissipation quantity is reduced as much as possible. It is also an object of the present invention to provide a method for saving a power consumption of such an image processing device. It is also an object of the present invention to provide a computer readable recording medium having a program recorded thereon to make a computer execute the method according to the present invention.

The image processing device according to the present invention has a first function block section formed of function blocks whose operation must be continued while the main power supply is on; and a second function block section formed of function blocks whose operation may be stopped while the main power supply is on. Thus, according to the image processing device and the method for saving a power consumption of this image processing device, whenever functional blocks of the second function block section are not to be operated, the power supply to the second function block section may be turned off while keeping the power supply to the first function block section on. Accordingly, the power can be saved.

A computer program which when executed realizes the method according to the present invention on a computer is stored in a recording medium like floppy disk or CD-ROM. Accordingly, the method according to the present invention can be realized readily and automatically.

Other objects and features of this invention will become apparent from the following description with reference to the accompanying drawings.

DESCRIPTION OF THE PREFERRED EMBODIMENTS

One preferred embodiment of an image processing device according to the present invention, a method for saving a power consumption of the device, and a computer readable recording medium having a program recorded thereon to make a computer execute the method will be described in detail by referring to accompanying drawing.

Figure 1:
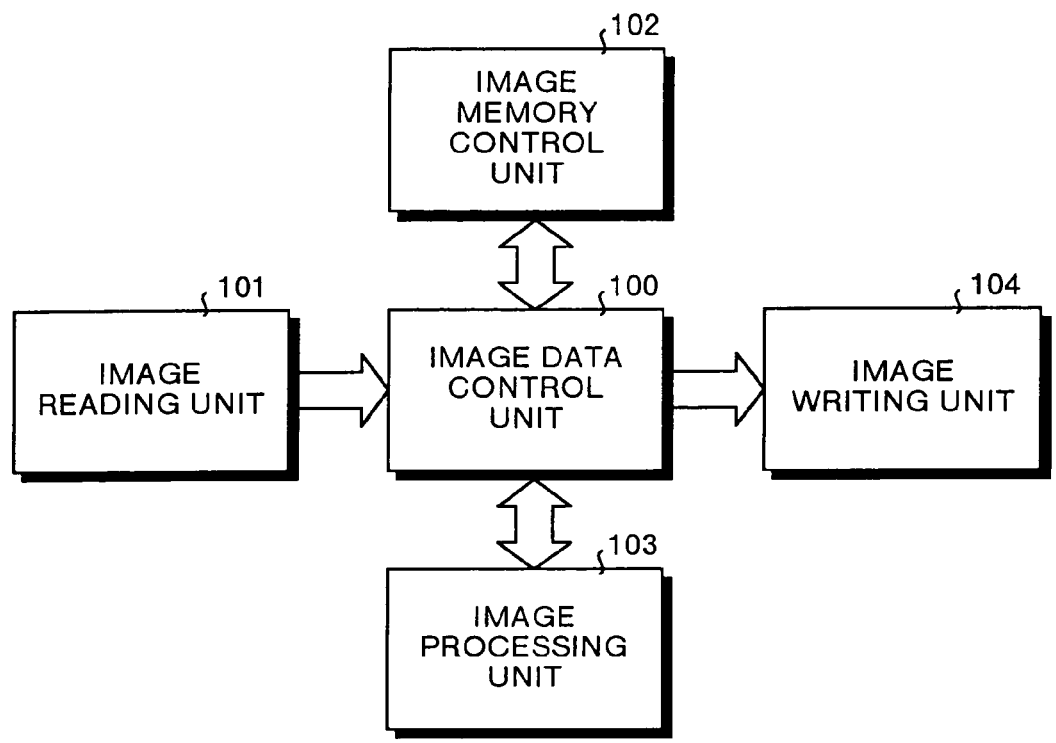
FIG. 1 is a block diagram functionally showing the configuration of an image processing device in an embodiment of the present invention.

First, the principle of an image processing device in an embodiment will now be described. FIG. 1 is a block diagram functionally showing the configuration of an image processing device in an embodiment of the present invention. As shown in FIG. 1, the image processing device includes five units described hereafter.

That is, the image processing device comprises an image data control unit 100, an image reading unit 101, an image memory control unit 102 for controlling an image memory which stores an image and writing/reading image data, an image processing unit 103 for conducting image processing such as processing and editing on image data, and an image writing unit 104 for writing (printing) image data on transfer paper or the like.

The image reading unit 101, the image memory control unit 102, the image processing unit 103, and the image writing unit 104 are connected to the image data control unit 100.

The image data control unit 100 conducts, for example, processing listed below.
(1) Data compression processing (primary compression) for improving the bus transfer efficiency of image data
(2) Transfer processing of the primary compression data to image data
(3) Image combining processing (It is possible to combine image data fed from a plurality of units. Combining on the data bus is also included.)
(4) Image shift processing (image shift in the main scanning direction and subsidiary scanning direction)
(5) Image area expansion processing (It is possible to expand the image area to the periphery by an arbitrary quantity.)
(6) Image variable multiplication processing (such as, for example, fixed variable multiplication of 50% or 100%)
(7) Parallel bus interface processing
(8) Serial bus interface processing (interface with a process controller 211 described later)
(9) Format conversion processing of parallel data and serial data
(10) Interface processing with the image reading unit 101
(11) Interface processing with the image processing unit 103
(12) Power supply management of respective units The image reading unit 101 conducts, for example, processing listed below.
(1) Read processing of reflected light of a manuscript conducted by an optical system
(2) Conversion processing to an electric signal in a CCD (Charge Coupled Device)
(3) Digitizing processing in an A/D converter
(4) Shading correction processing (processing of correcting illumination distribution unevenness of the light source)
(5) Scanner $\gamma$ correction processing (processing of correcting density characteristics of the reading system)

The image memory control unit 102 conducts, for example, processing listed below.
(1) Interface control processing with system controller
(2) Parallel bus control processing (interface control processing with a parallel bus)
(3) Network control processing
(4) Serial bus control processing (control processing of a plurality of external serial ports)
(5) Internal bus interface control processing (command control processing with an operation section)
(6) Local bus control processing (access control processing of a ROM, a RAM, and font data for starting a system controller)
(7) Operation control processing of a memory module (such as write/read control processing of the memory module)
(8) Access control processing for the memory module (processing for arbitrating memory access requests issued by a plurality of units)
(9) Data compression/expansion processing (processing for reducing the data quantity in order to use the memory efficiently)
(10) Image editing processing (such as data clear of a memory area, rotation processing of image data, and image combining processing on the memory)

Figure 2:
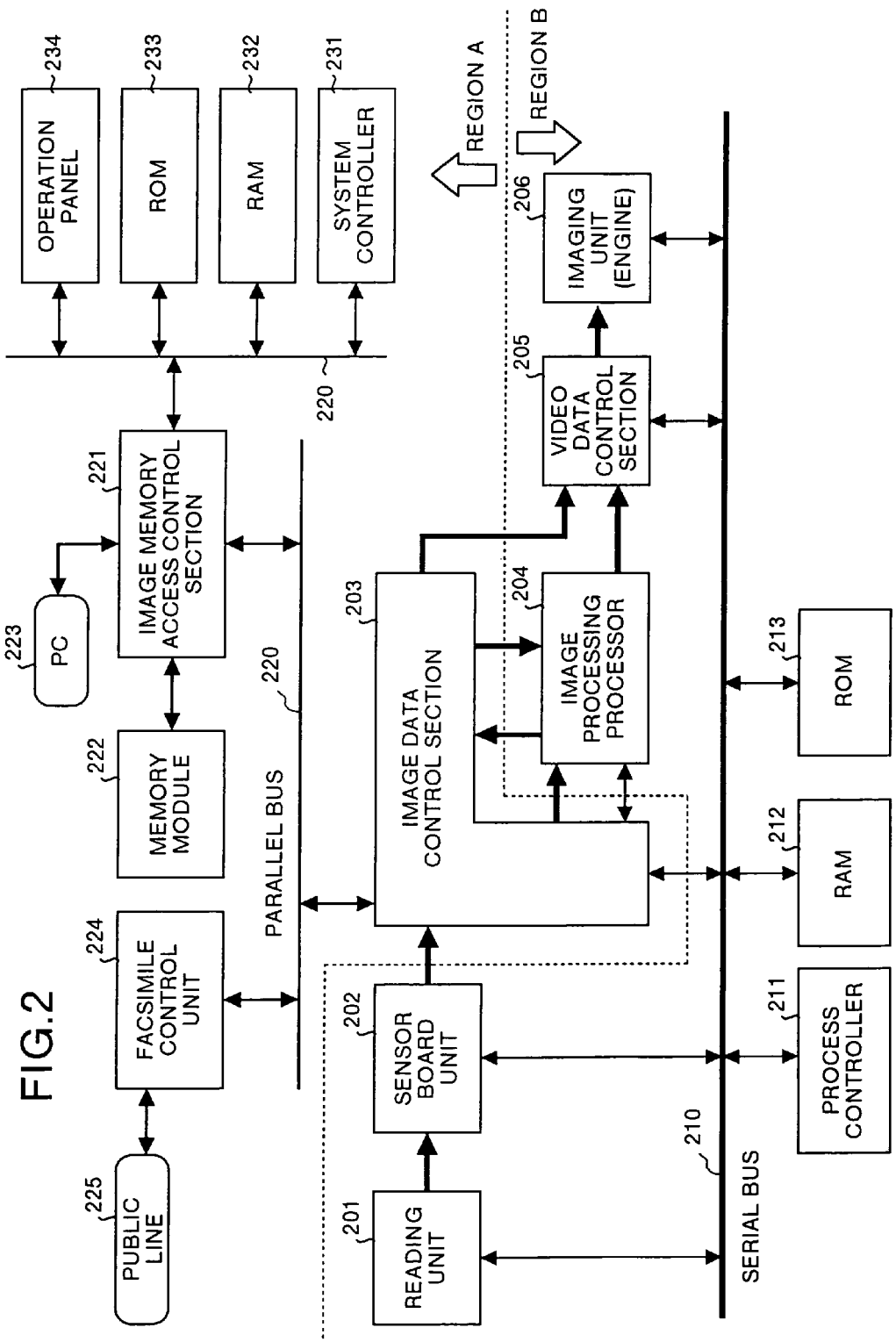
FIG. 2 is a block diagram showing an example of a hardware configuration of an image processing device in an embodiment of the present invention.

The image processing unit 103 conducts, for example, processing listed below.
(1) Shading correction processing (processing of correcting illumination distribution unevenness of the light source)
(2) Scanner $\gamma$ correction processing (processing of correcting density characteristics of the reading system)
(3) MTF correction processing
(4) Smoothing processing
(5) Arbitrary variable multiplication processing in the main scanning direction
(6) Density conversion ($\gamma$ conversion which corresponds to density notch)
(7) Simple multi-value provision processing
(8) Simple binarization processing
(9) Error diffusion processing
(10) Dither processing
(11) Dot arrangement phase control processing (dot which is a little to the right, dot which is a little to the left)
(12) Isolated point reduction processing
(13) Image region separation processing (color identification, attribute identification, adaptive processing)
(14) Density conversion processing The image writing unit 104 conducts, for example, processing listed below.
(1) Edge smoothing processing (jaggy correction processing)
(2) Correction processing for dot rearrangement
(3) Pulse control processing of the image signal
(4) Format conversion processing between parallel data and serial data The hardware configuration in the case where an image processing device of the present embodiment forms a digital composite machine will now be described. FIG. 2 is a block diagram showing an example of a hardware configuration of an image processing device in the present embodiment.

As shown in FIG. 2, the image processing device of the present embodiment includes a reading unit 201, a sensor board unit 202, an image data control section 203, an image processing processor 204, a video data control section 205, and an imaging unit (engine) 206. In addition, the image processing device of the present embodiment includes a process controller 211, a RAM 212, and a ROM 213, which are connected to a serial bus 210.

In addition, the image processing device of the present embodiment includes an image memory access control section 221, a memory module 222, and a facsimile control unit 224, via a parallel bus 220. In addition, the image processing device of the present embodiment includes a system controller 231, a RAM 232, a ROM 233 and an operation panel 234, which are connected to the image memory access control section 221.

Function blocks such as the reading unit 201, the sensor board unit 202, the image processing processor 204, the video data control section 205, and the imaging unit (engine) 206, and the process controller 211, the RAM 212, and the ROM 213 connected to the serial bus 210 belong to a region B of the image processing device as illustrated. These function blocks form a second function block section which can be stopped in operation even while a main power supply of the image processing device is in its on-state.

Function blocks such as the image data control section 203, the image memory access control section 221, and the facsimile control unit 224, which are connected to the parallel bus 220, and the memory module 222, the system controller 231, the RAM 232, the ROM 233, and the operation panel 234, which are connected to the image memory access controller 221 belong to a region A of the image processing device as illustrated. These function blocks form a first function block section which must be continued in operation while the main power supply of the image processing device is in the on-state.

Relations between the above described components and the units 100 to 104 shown in FIG. 1 will now be described. The reading unit 201 and the sensor board unit 202 implement the function of the image reading unit 101 shown in FIG. 1. In the same way, the image data control section 204 implements the function of the image data control unit 100. In the same way, the image processing processor 203 implements the function of the image processing unit 103.

In the same way, the video data control section 205 and the imaging unit (engine) 206 implement the image writing unit 104. In the same way, the image memory access control section 221 and the memory module 222 implement the image memory control unit 102.

Contents of respective components will now be described. The reading unit 201 for optically reading the image of a manuscript includes a lamp, a mirror, and a lens. The reading unit 201 focuses light illuminated by the lamp and reflected by the manuscript onto light receiving elements by using the mirror and the lens.

The light receiving elements, for example, CCDs are mounted on the sensor board unit 202. Image data converted to an electric signal by the CCDs is converted to a digital signal, and then transmitted from the sensor board unit 202.

The image data transmitted from the sensor board unit 202 is received by the image data control section 203. All of the components of FIG. 2 and transmission of image data between the data buses are controlled by the image data control section 203.

The image data control section 203 conducts image data transfer among the sensor board unit 202, the parallel bus 220, and the image processing processor 204. In addition, the image data control section 203 conducts image data communication between the process controller 211 and the system controller 231 which takes charge of control of the whole image processing device. The RAM 212 is used as a work area of the process controller 211. The ROM 213 stores a boot program and the like of the process controller 211.

The image data transmitted from the sensor board unit 202 is transferred to the image processing processor 204 via the image data control section 203, corrected in signal degradation caused by the optical system and quantization to the digital signal (signal degradation in the reading system), and transmitted to the image data control section 203 again.

The image memory access control section 221 controls writing/reading image data into/from the memory module 222. In addition, the image memory access control section 221 controls operation of components connected to the parallel bus 220. The RAM 232 is used as a work area of the system controller 231. The ROM 233 stores a boot program and the like of the system controller 231.

The operation panel 234 inputs processing contents to be conducted by the image processing device. For example, the operation panel 234 inputs the kind of processing (such as duplication, facsimile transmission, image reading, and printing) and the number of sheets of processing. As a result, image data control information can be inputted. Contents of the facsimile control unit 224 will be described later.

There are such jobs that read image data is stored in the memory module 222 and reused, and such jobs that read image data is not stored in the memory module 222. Respective cases will now be described. As an example of a job in which image data is stored in the memory module 222, there is a method used in the case where a plurality of sheets of duplication are obtained from one sheet of a manuscript. The method includes the steps of activating the reading unit 201 only once, storing image data of a manuscript read by the reading unit 201 into the memory module 222, and reading out the stored image data a plurality of times.

As an example of a job in which image data is not stored in the memory module 222, there is a method used in the case where only one sheet of duplication is obtained from one sheet of a manuscript. The method includes the steps of activating the reading unit 201 only once, and reproducing image data of a manuscript read by the reading unit 201, as it is. Since in this case the read image data can be reproduced as it is, it is not necessary for the image memory access control section 221 to access the memory module 222.

First, in the case where image data is not stored in the memory module 222, image data transferred from the image processing processor 204 to the image data control section 203 is returned from the image data control section 203 to the image processing processor 204. In the image processing processor 204, image quality processing for converting luminance data obtained by the CCDs in the sensor board unit 202 to area gradation is conducted.

Image data after image quality processing is transferred from the image processing processor 204 to the video data control section 205. The signal converted to the area gradation is subjected to post processing concerning the dot arrangement and pulse control for reproducing the dots. Thereafter, the reproduced image is printed on the transfer paper in the imaging unit 206.

It is now assumed that image data is stored in the memory module 222 and subjected to additional processing, such as rotation in image direction and image combining, at the time of image readout. A flow of image data in this case will now be described. Image data transferred from the image processing processor 204 to the image data control section 203 is transmitted from the image data control section 203 to the image memory access control section 221 via the parallel bus 220.

In the image memory access control section 221, access control of the image data and the memory module 222, development of printing data of an external PC (personal computer) 223, and compression/expansion of image data for using the memory module 222 effectively are conducted on the basis of the system controller 231.

The image data transmitted to the image memory access control section 221 is subjected to data compression and then stored in the memory module 222. The image thus stored is read out as occasion demands. The image data read out is expanded, restored to the original image data, and returned from the image memory access control section 221 to the image data control section 203 via the parallel bus 220.

After transfer from the image data control section 203 to the image processing processor 204, the image data is subjected to image quality processing, and pulse control in the video data control section 205. In the imaging unit 206, the reproduced image is printed on transfer paper.

In the flow of the image data, the function of the digital composite machine is implemented by the parallel bus 220 and bus control in the image data control section 203. The function of facsimile transmission is a function of conducting image processing on the image data read out, in the image processing processor 204, and transferring resultant data to the facsimile control unit 224 via the image data control section 203 and the parallel bus 220. In the facsimile control unit 224, data conversion for transmission to a communication network is conducted. Resultant data is transmitted to a public line (PN) 225 as facsimile data.

On the other hand, facsimile data received from the public line (PN) 225 is converted to image data in the facsimile control unit 224, and the resultant image data is transferred to the image processing processor 204 via the parallel bus 220 and the image data control section 203. In this case, special image quality processing is not conducted, but dot rearrangement and pulse control are conducted in the video control section 205, and the reproduced image is printed on transfer paper in the imaging unit 206.

In a multi-job situation, such as a situation that the copy function, the facsimile transmission and reception function, and the printer output function are performed in parallel, assignment of the right of using the reading unit 201, the imaging unit 206, and the parallel bus 220 to jobs is controlled in the system controller 231 and the process controller 211.

The process controller 211 controls the flow of the image data. The system controller 231 controls the whole system, and controls start of resources. As for the function selection of the digital composite machine, a function is selected and inputted on the operation panel 234. A processing concept such as the copy function, facsimile function, or the like is thus set.

The system controller 231 and the process controller 211 communicate with each other via the parallel bus 220, the image data control section 203, and the serial bus 210. To be concrete, communication between the system controller 231 and the process controller 211 is performed by conducting data format conversion for data interface of the parallel bus 220 and the serial bus 210, in the image data control section 203.

(Image Processing Unit 103/Image Processing Processor 204)

Figure 3:
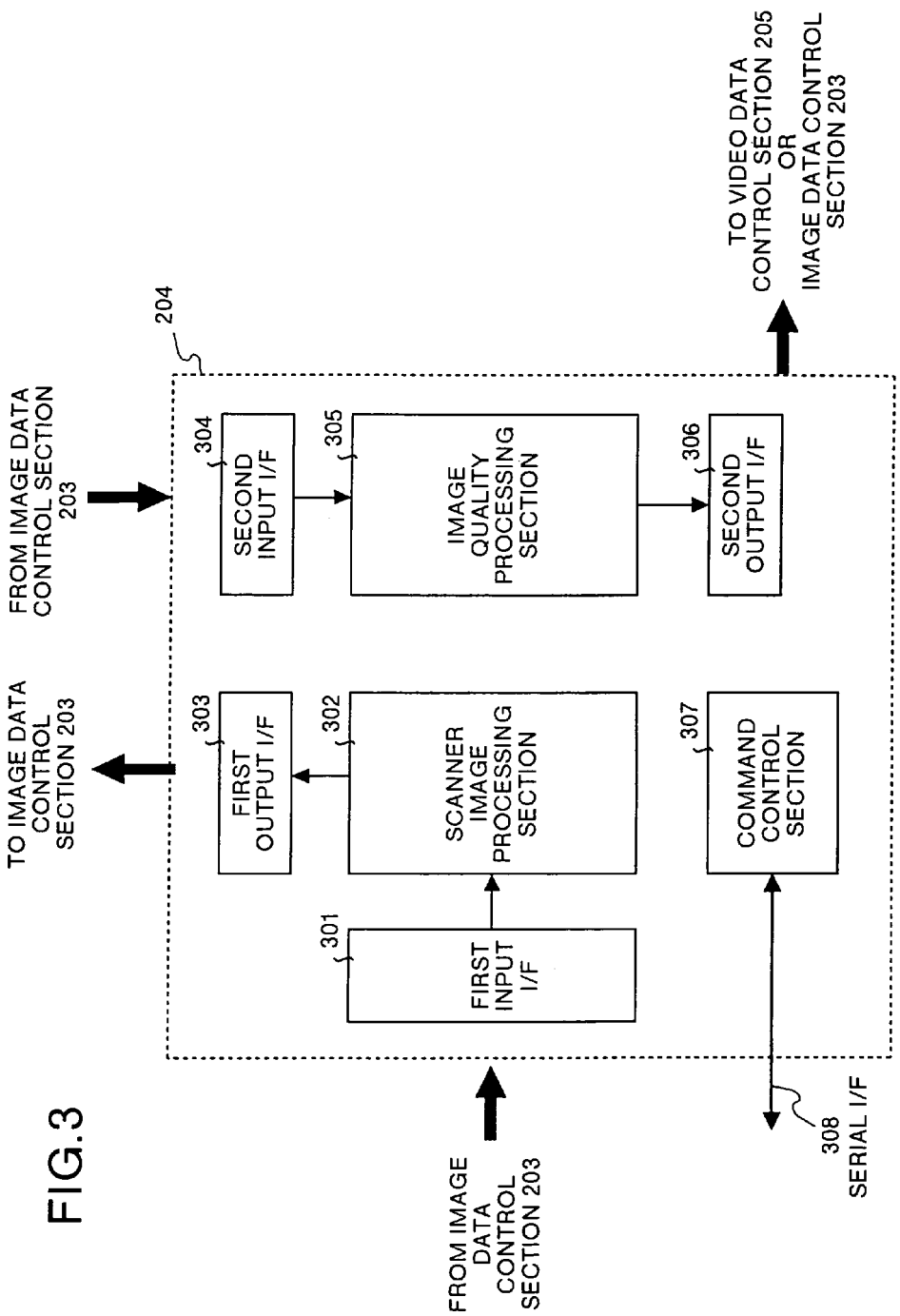
FIG. 3 is a block diagram showing an outline of processing of an image processing processor of an image processing device in an embodiment of the present invention.

An outline of processing conducted in the image processing processor 204 forming the image processing unit 103 will now be described. FIG. 3 is a block diagram showing the outline of processing conducted in the image processing processor 204 of the image processing device in the present embodiment.

As shown in FIG. 3, the image processing processor 204 includes a first input I/F 301, a scanner image processing section 302, a first output I/F 303, a second input I/F 304, an image quality processing section 305, and a second output I/F 306.

In the above described configuration, image data which has been read is transmitted to the scanner image processing section 302 of the image processing processor 204 via the sensor board unit 202, the image data control section 203, and the first input interface (I/F) 301 of the image processing processor 204.

An object of the image processing conducted in the scanner image processing section 302 is to correct degradation of the read image data. To be concrete, shading correction, scanner y correction, MTF correction, and so on are conducted. Although it is not correction processing, the variable multiplication processing of expansion/compression can also be conducted. If the correction processing of the read image data is finished, then image data is transferred to the image data control section 203 via the first output interface (I/F) 303.

When printing image data on transfer paper, the image quality processing section 305 receives image data from the image data control section 203 via the second input I/F 304 and conducts area gradation processing. Image data after image quality processing is outputted to the video data control section 205 or the image data control section 203 via the second output I/F 306.

As the area gradation processing conducted in the image quality processing section 305, there are density conversion processing, dither processing, error diffusion processing. Area approximation of gradation information is principal processing. Once image data processed by the scanner image processing section 302 is stored in the memory module 222, various reproduced images can be confirmed by changing the image quality processing conducted by the image quality processing section 305.

For example, by waving (altering) the density of the reproduced image or altering the number of lines of the dither matrix, the atmosphere of the reproduced image can be easily altered. In this case, it is not necessary to read image from the reading unit 201 over again each time the image quality processing is altered. By reading out the image data stored in the memory module 222, different image quality processing can be rapidly conducted on the same image data any number of times.

In the case of a scanner alone, the scanner image processing and the gradation processing are conducted collectively, and resultant image data is outputted to the image data control section 203. The processing concept can be altered in a programmable manner. The processing switchover and the processing procedure alteration are managed in a command control section 307 via a serial I/F 308.

(Image Data Control Unit 100/Image Data Control Section 203)

Figure 4:
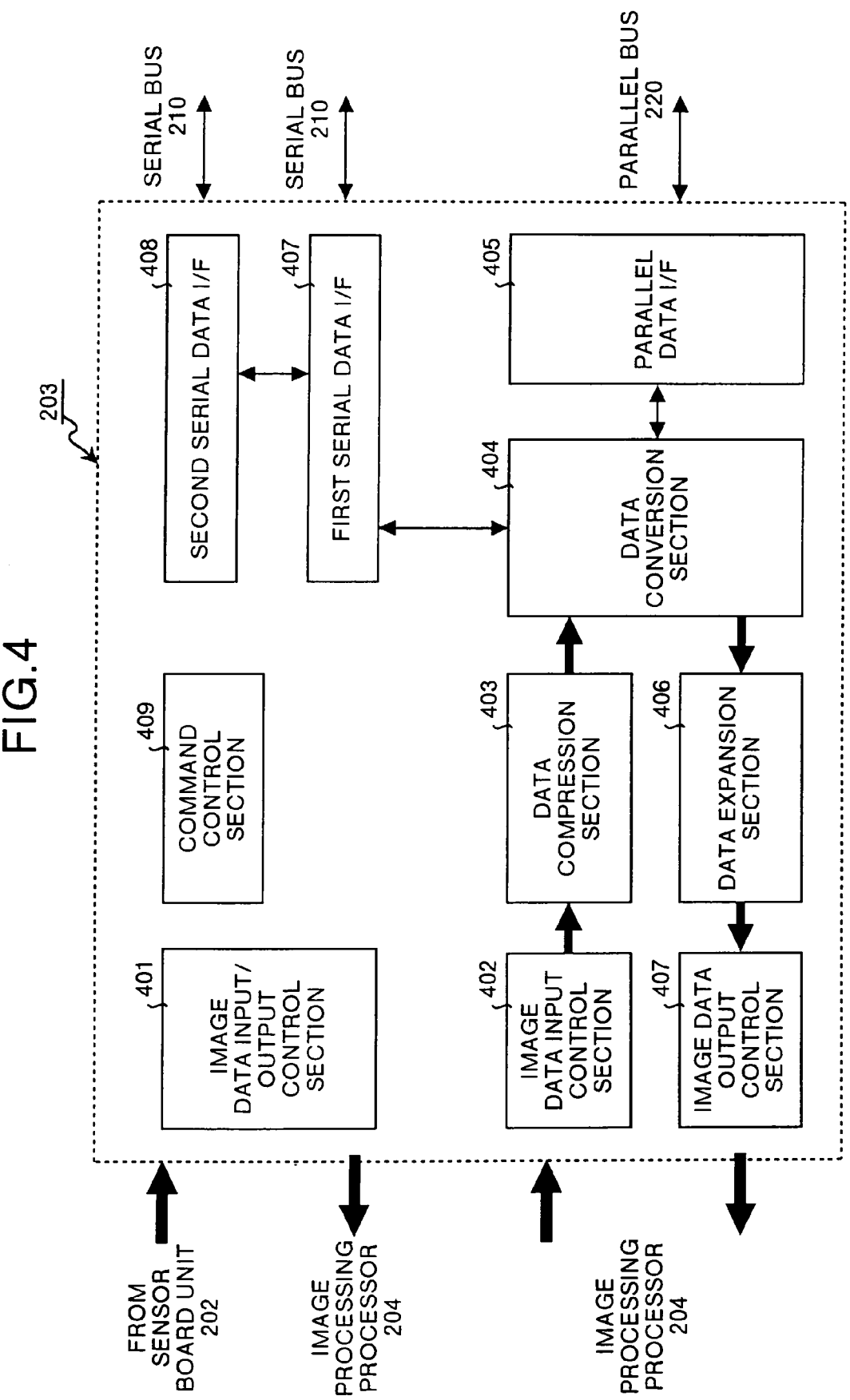
FIG. 4 is a block diagram showing an outline of processing of an image data control section of an image processing device in an embodiment of the present invention.

An outline of processing conducted in the image data control section 203 forming the image data control unit 100 will now be described. FIG. 4 is a block diagram showing the outline of processing conducted in the image data control section 203 of the image processing device in the present embodiment.

As shown in FIG. 4, an image data input output control section 401 receives image data fed from the sensor board unit 202, and transmits image data to the image processing processor 204. In other words, the image data input output control section 401 is a component for connecting the image reading unit 101 and the image processing unit 103 (the image processing processor 204). The image data input output control section 401 can be said to be a dedicated input output section for only transmitting the image data read by the image reading unit 101 to the image processing unit 103.

The image data input control section 402 receives the image data read by the image processing processor 204 and corrected in signal degradation of the reading system. In order to enhance the transfer efficiency on the parallel bus 220, the received image data is subjected to data compression processing in a data compression section 403. Image data subjected to data compression is then sent out to the parallel bus 220 via the data conversion section 404 and the parallel data I/F 405.

Since the image data inputted from the parallel bus 220 via the parallel data I/F 405 has a compressed form for bus transfer, the image data is sent to a data expansion section 406 via the data conversion section 404, and subjected to data expansion processing therein. Image data subjected to data expansion is transferred from an image data output control section 407 to the image processing processor 204.

The image data control section 203 has a conversion function between parallel data and serial data. The system controller 231 transfers data to the parallel bus 220. The process controller 211 transfers data to the serial bus 210. The image data control section 203 conducts data conversion for communication of two controllers.

The serial data I/F includes a first serial data I/F 407 for exchanging data with the process controller 211 via the serial bus 210 and a second serial data I/F 408 for exchanging data I/F with the image processing processor 204. Since one system is provided independently for the image processing processor 204, the interface with respect to the image processing processor 204 can be smoothed.

In accordance with an inputted instruction, a command control section 409 controls operation of the above described components and interfaces included in the image data control section 203.

Figure 5:
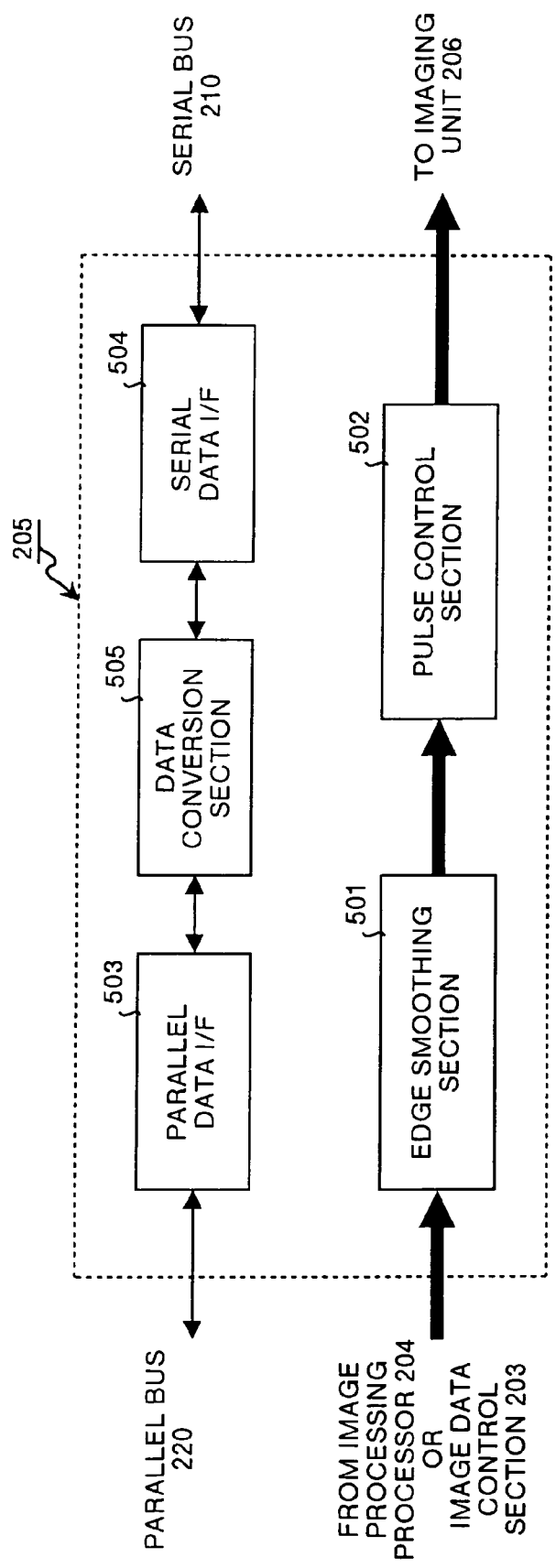
FIG. 5 is a block diagram showing an outline of processing of a video data control section of an image processing device in an embodiment of the present invention.

An outline of processing conducted in the video data control section 205 forming a part of the image writing unit 104 will now be described. FIG. 5 is a block diagram showing the outline of processing conducted in the video data control section 205 of the image processing device in the present embodiment.

As shown in FIG. 5, the video data control section 205 conducts additional processing on inputted image data according to the characteristic of the imaging unit 206. In other words, an edge smoothing processing section 501 conducts dot rearrangement processing using edge smoothing processing. A pulse control section 502 conducts pulse control of the image signal to form dots, and outputs image data subjected to the above described processing to the imaging unit 206.

Apart from the conversion of the image data, the video data control section 205 has a format conversion function between the parallel data and the serial data. Even the video data control section 205 alone can cope with the communication of the system controller 231 and the process controller 211. In other words, the video data control section 205 includes a parallel data I/F 503 for transmitting and receiving the parallel data, a serial data I/F 504 for transmitting and receiving the serial data, and a data conversion section 505 for conducting mutual conversion between data received by the parallel data I/F 503 and the data received by the serial data I/F 504. As a result, the video data control section 205 converts formats of both data.

Figure 6:
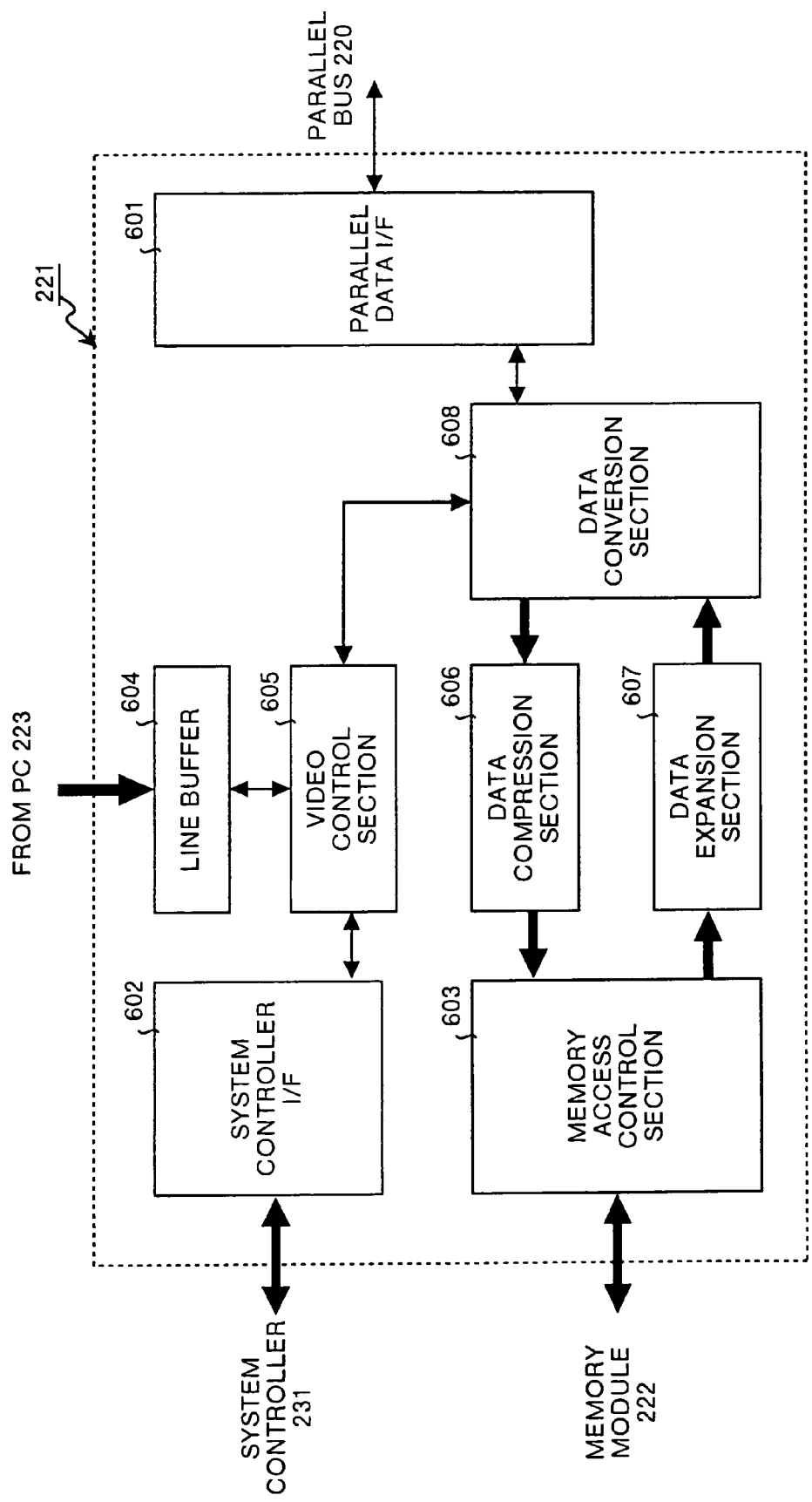
FIG. 6 is a block diagram showing an outline of processing of an image memory access control section of an image processing device in an embodiment of the present invention.

An outline of processing conducted in the image memory access control section 221 forming a part of the image memory control unit 102 will now be described. FIG. 6 is a block diagram showing the outline of processing conducted in the image memory access control section 221 of the image processing device in the present embodiment.

As shown in FIG. 6, the image memory access control section 221 manages the interface of image data with respect to the parallel bus 220, controls access to the memory module 222 for image data, i.e., storage (writing)/reading, and controls the development of code data inputted from mainly external PC 223 to image data.

For that purpose, the image memory access control section 221 includes a parallel data I/F 601, a system controller I/F 602, a memory access control section 603, a line buffer 604, a video control section 605, a data compression section 606, a data expansion section, 607, and a data conversion section 608.

The parallel data I/F 601 manages the interface of image data with respect to the parallel bus 220. The memory access control section 603 controls access to the memory module 222 for image data, i.e., storage (writing)/reading.

Inputted code data conducts data storage in a local region in the line buffer 604. On the basis of a development processing instruction issued by the system controller 231 and inputted via the system controller I/F 602, the code data stored in the line buffer 604 is developed into image data in the video control section 605.

The developed image data or the image data inputted from the parallel bus 220 via the parallel data I/F 601 is stored in the memory module 222. In this case, image data to be stored is selected in the data conversion section 608. In the data compression 606, data compression is conducted in order to improve the memory use efficiency. The memory access control section 603 stores (writes) image data in the memory module 222 while managing the address of the memory module 222.

Readout of the image data stored in the memory module 222 is effected by control of the read destination address conducted in the access control section 603. The read out image data is expanded in the data expansion section 607. When transferring the expanded image to the parallel bus 220, the expanded image data is transferred via the parallel data I/F 601.

Figure 7:
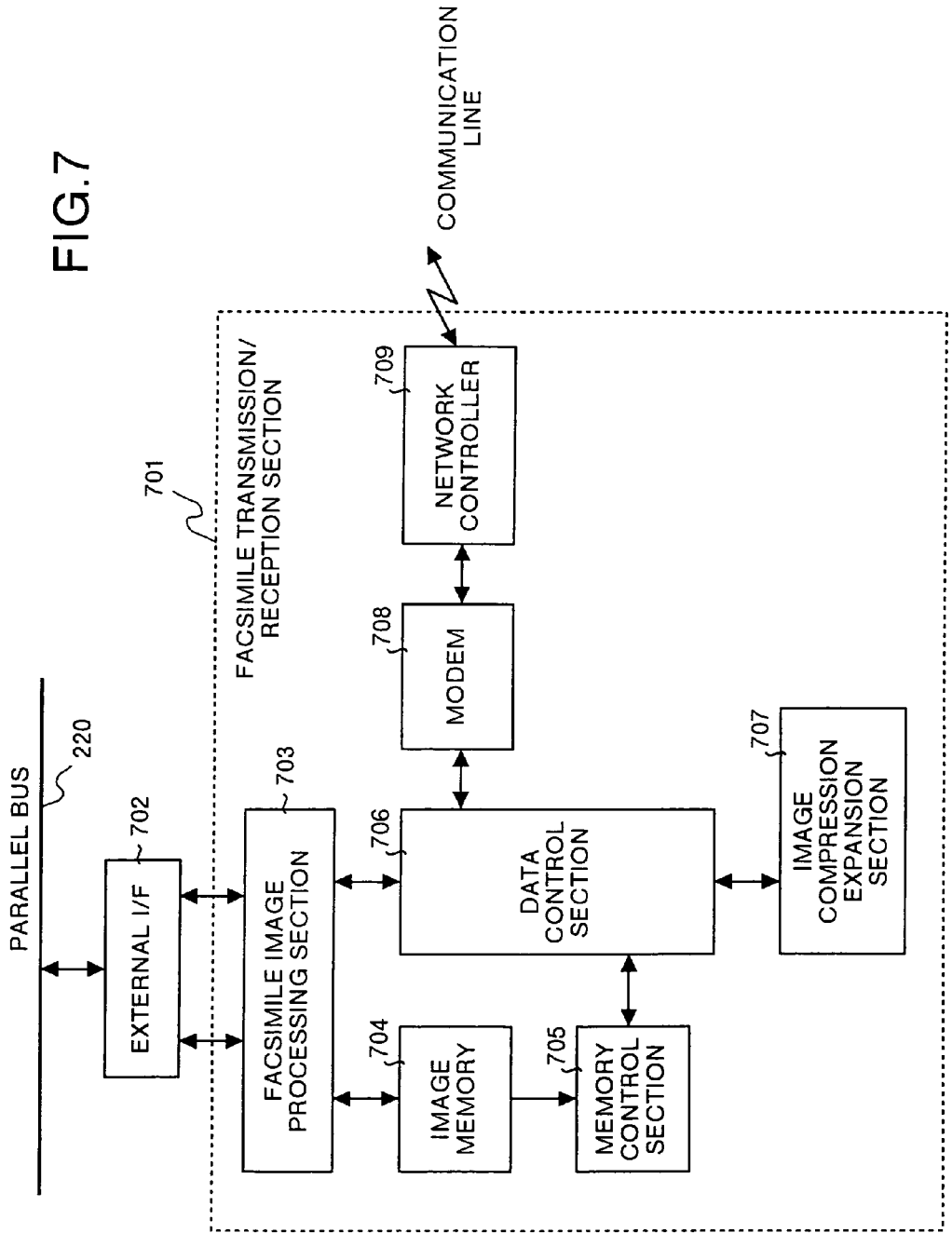
FIG. 7 is a block diagram showing the configuration of a facsimile control unit of an image processing device in an embodiment of the present invention.

The functional configuration of the facsimile control unit 224 will now be described. FIG. 7 is a block diagram showing the configuration of the facsimile control unit 224 of the image processing device in the present embodiment.

As shown in FIG. 7, the facsimile control unit 224 includes a facsimile transmission and reception section 701 and an external I/F 702. The facsimile transmission and reception section 701 converts image data to a communication form and transmits are result to an external line. Furthermore, the facsimile transmission and reception section 701 restores external data to the image data, transfers the image data via the external I/F section 702 and the parallel bus 220, and prints the image data for recording in the imaging unit 206.

The facsimile transmission and reception section 701 includes a facsimile image processing section 703, an image memory 704, a memory control section 705, a data control section 706, an image compression expansion section 707, a modem 708, and a network control device 709.

As for the image processing of facsimile, binary smoothing processing on the received image is conducted in the edge smoothing processing section 501 included in the video data control section 205 shown in FIG. 5. As for the image memory 704 as well, a part of its output buffer function is shifted to the image memory access control section 221 and the memory module 222.

When starting transmission of image data in the facsimile transmission and reception section 701 having such a configuration, the data control section 706 orders the memory control section 705 to successively read out image data stored in the image memory 704. The facsimile image processing section 703 restores the image data read out to the original signal, conducts density conversion processing and variable multiplication processing on the restored signal, and supplies a resultant signal to the data control section 706.

Image data supplied to the data control section 706 is subjected to code compression in the image compression expansion section 707, modulated by the modem 708, and sent out to the destination via the network control device 709. Image information completed in transmission is deleted from the image memory 704.

At the time of reception, a received image is temporarily stored in the image memory 704. If the received image can be recorded and outputted at that time, then the received image is recorded and outputted at the time when reception of the image corresponding to one sheet has been completed. When a call is originated and reception is started at the time of duplication operation, the received image is stored in the image memory 704 until the use factor of the image memory 704 reaches a predetermined value such as 80%. When the use factor of the image memory 704 has reached 80%, write operation which is being executed at that time is forcibly interrupted, and the received image is read out from the image memory 704 and printed for recording.

The received image read out from the image memory 704 is deleted from the image memory 704 at this time. At the time when the use factor of the image memory 704 has fallen to a predetermined value such as 10%, the interrupted write time is restarted. At the time when all of the write operation has been finished, remaining received images are printed for recording. Furthermore, after the write operation has been interrupted, various parameters for write operation at the time of interruption are temporarily saved internally so as to allow restart. At the time of restart, the parameters are internally restored.

The image processing device in the present embodiment has a schematic configuration heretofore described. Schematic processing of the image processing device serving as a digital composite machine of the present embodiment will now be described.

First, processing conducted since storage of an image in the memory module 222 of the image processing device in the present embodiment until printing of the image in the imaging unit 206 will be described.

Figure 8:
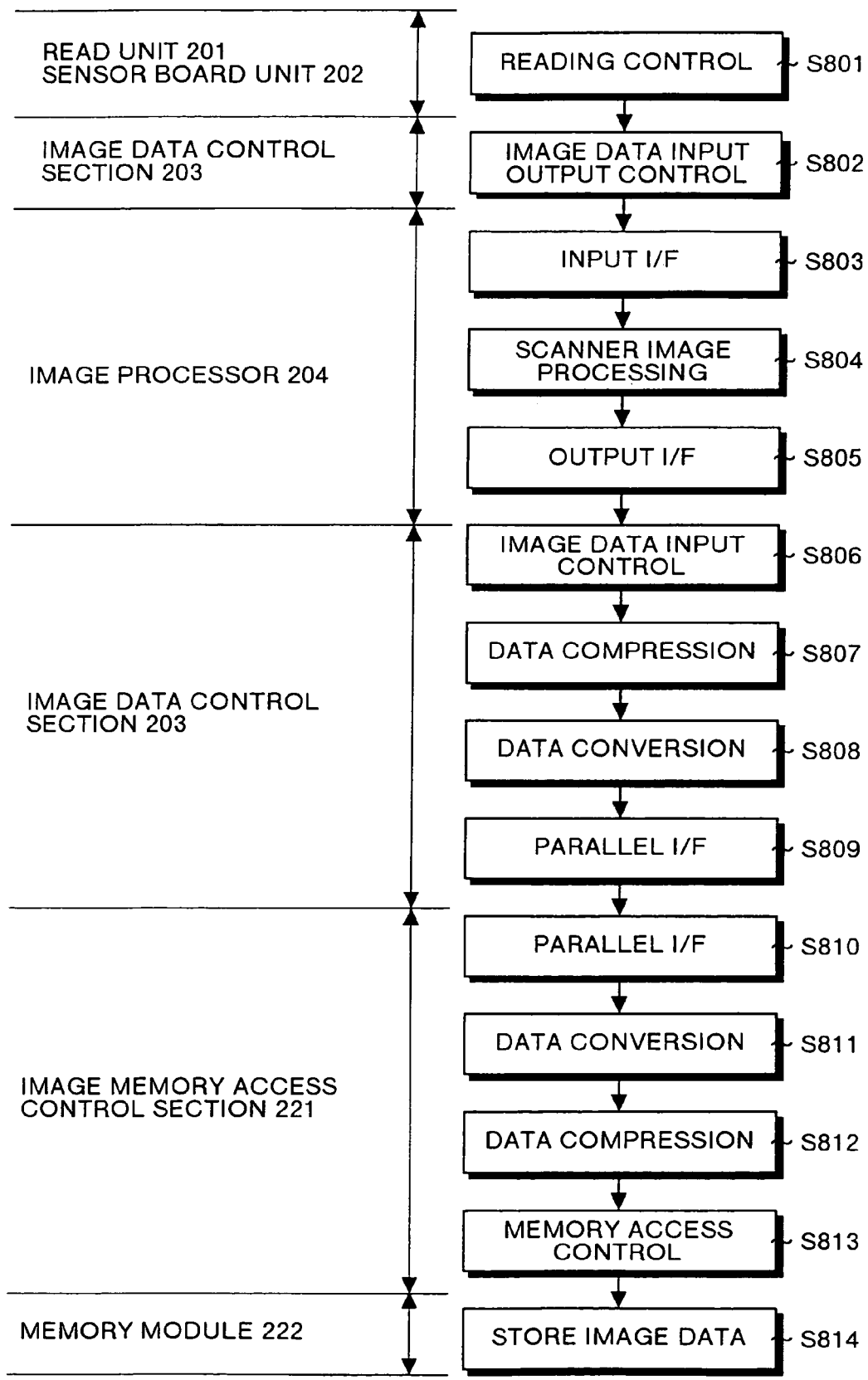
FIG. 8 is a flow chart showing processing conducted until an image is stored in a memory module in an embodiment of the present invention.
Figure 9:
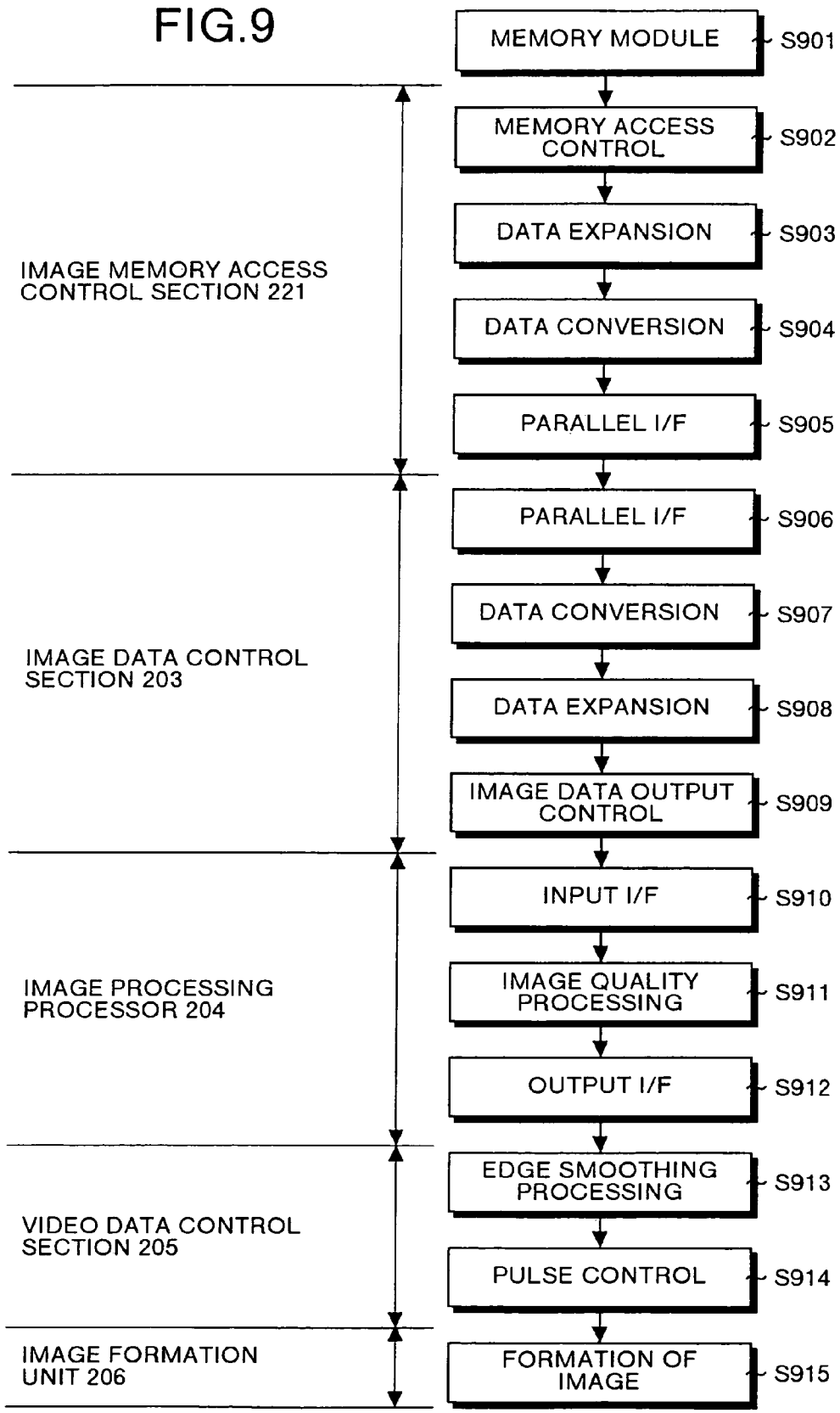
FIG. 9 is a flow chart showing processing conducted until an image is printed in an imaging unit in an embodiment of the present invention.

FIG. 8 is a flow chart showing processing conducted until the image is stored in the memory module 222 in the present embodiment. FIG. 9 is a flow chart showing processing conducted until the image is printed in the imaging unit 206. Each processing is conducted by controlling a data flow between the bus and the unit under the control of the image data control section 203.

With reference to FIG. 8, the reading unit 201 and the sensor board unit 202 first effects reading control (step S801). Subsequently, the image data control section 203 conducts the input processing and output control of image data (step S802). Subsequently, the image processing processor 204 conducts input I/F control processing (step S803), conducts scanner image processing (step S804), and conducts output I/F processing (step S805).

Subsequently, the image data control section 203 conducts input processing of the image data again (step S806) conduct data compression (step S807) and data conversion (step S808), and conduct parallel I/F control processing (step S809).

Subsequently, the image memory control section 221 conducts the parallel I/F control processing (step S810), conducts data conversion (step S811), conducts further data compression (step S812), and conducts memory access control on the memory module 222 (step S813). As a result, the image data is stored in the memory module 222 (step S814).

With reference to FIG. 9, with respect to the image data stored in the memory module 222 (step S901), the image memory access control section 221 effects memory access control (step S902), conducts data expansion (step S903) and data conversion (step S904), and conducts parallel I/F control processing (step S905).

Subsequently, the image data control section 203 effects the parallel I/F control (step S906), conducts data conversion (step S907), conducts data expansion (step S908) and effects image data output control (step S909).

Subsequently, the image processing processor 204 conducts input I/F control processing (step S910), conducts image quality processing (step S911), and conducts output I/F control processing (step S912).

Subsequently, the video data control section 205 conducts edge smoothing processing (step S913), and effects pulse control (step S914). Thereafter, the imaging unit 206 conducts image processing (step S915).

As regards the read image data, scanner image processing is carried out in the image processing processor 204. As regards the image data to be outputted to the imaging unit 206, image quality processing is carried out in image processing processor 204 independently of the scanner image processing.

The scanner image processing and the image quality processing can be conducted in parallel. The read out image is used for facsimile transmission. In parallel, image data stored in the memory module 222 beforehand can be outputted to transfer paper while changing the content of the image quality processing.

Figure 10:
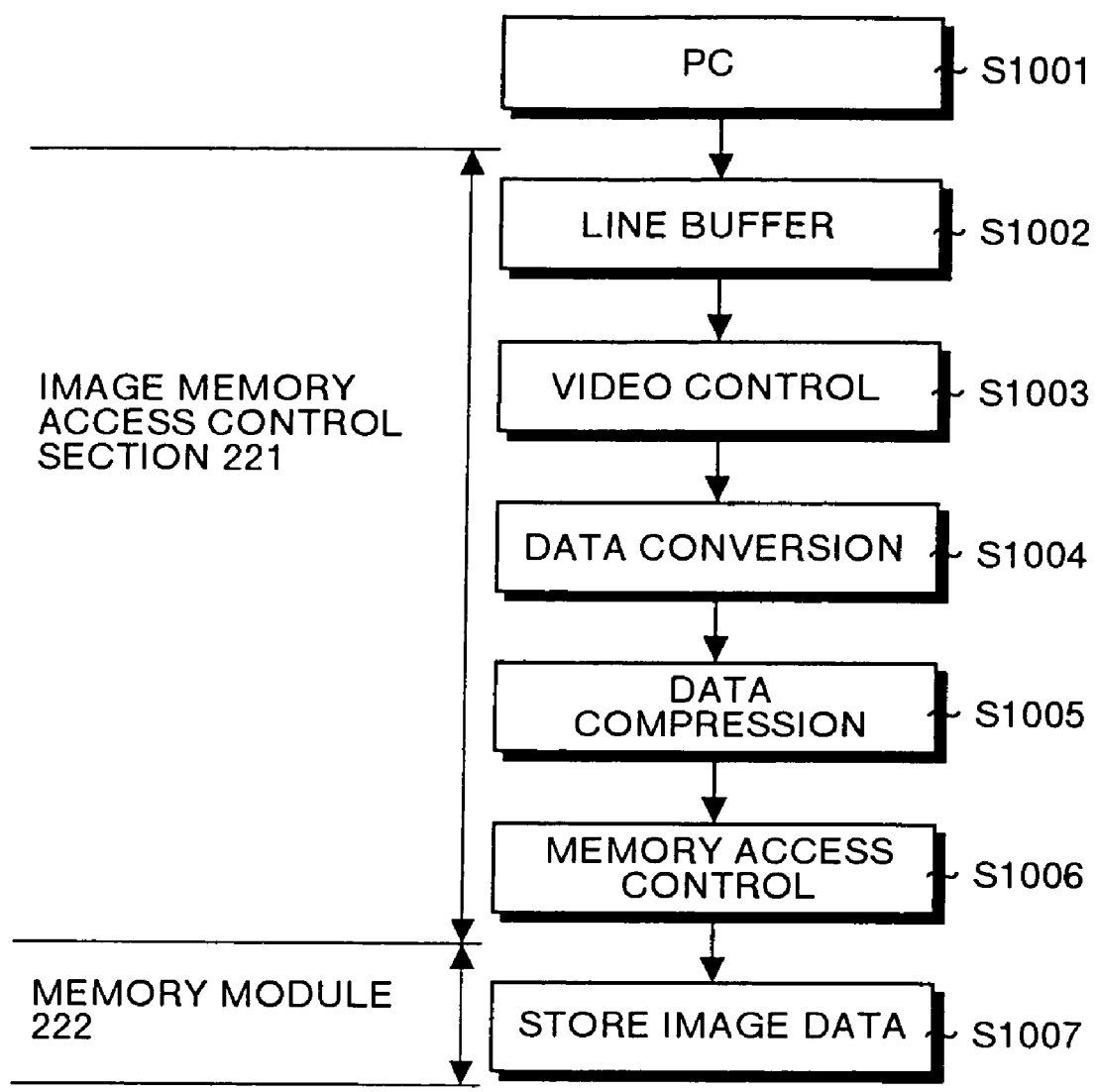
FIG. 10 is a flow chart showing processing conducted until an image fed from a personal computer is stored in a memory module in an embodiment of the present invention.
Figure 11:
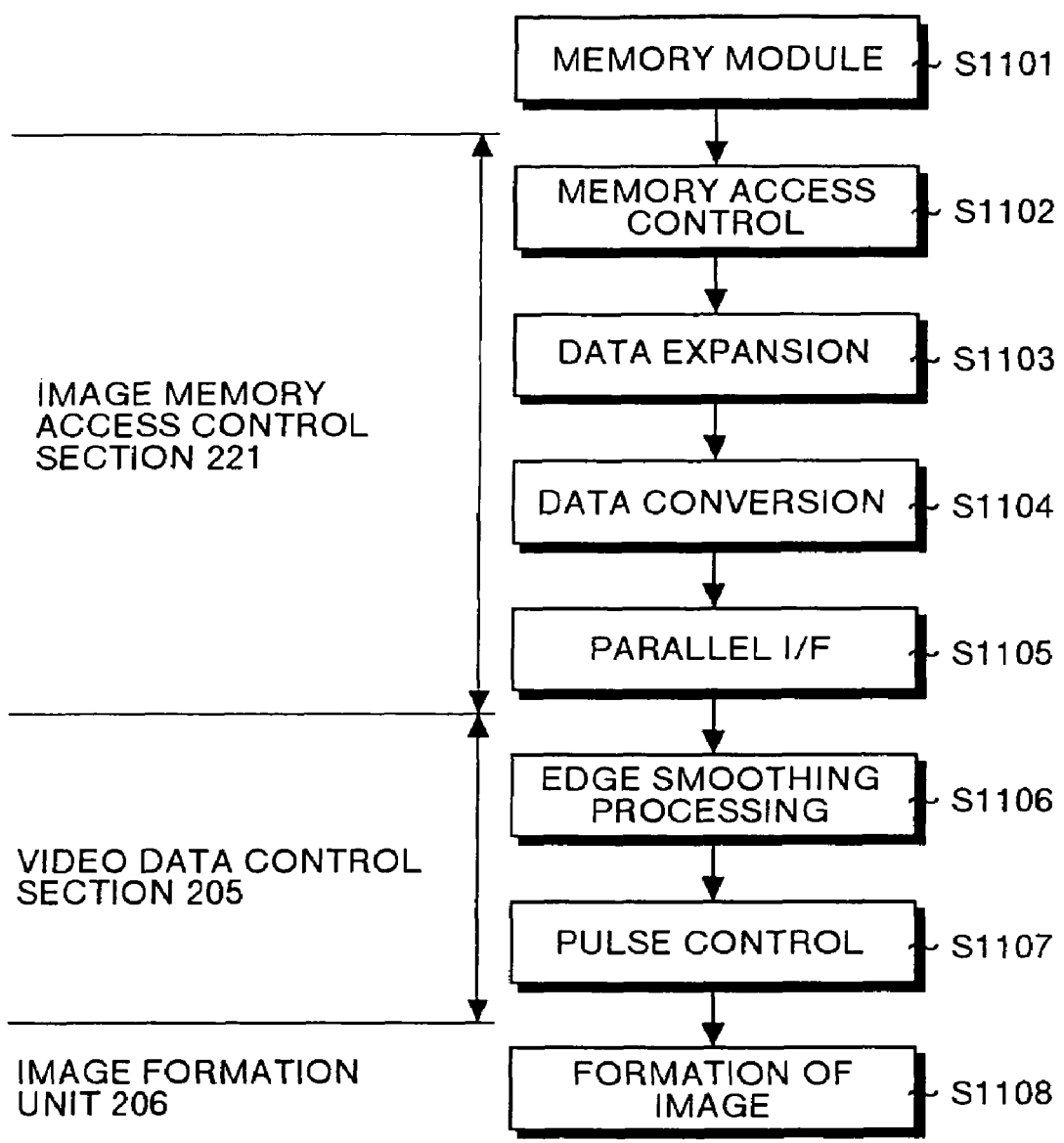
FIG. 11 is a flow chart showing processing conducted until an image of a memory module is printed in an imaging unit in an embodiment of the present invention.

The case where the image processing device in the present embodiment is a printer alone will now be described. FIG. 10 is a flow chart showing processing conducted until an image fed from the PC 223 is stored in the memory module 222 in the present embodiment. FIG. 11 is a flow chart showing processing conducted until the image of the memory module 222 is printed in the imaging unit 206.

With reference to FIG. 10, the PC 223 outputs image data (step S1001). The image memory access control section 221 holds the image data by using a line buffer (step S1002) effects video control (step S1003), conducts data compression (step S1004) and data compression (step S1005) and effects memory access control on the memory module 222 (step S1006). As a result, the image data is stored in the memory module 222.

With reference to FIG. 11, with respect to the image data stored in the memory module 222 (step S1101), the image memory access control section 221 effects memory access control (step S1102), conducts data expansion (step S1103) and data conversion (step S1104), and conducts parallel I/F control processing (step S1105).

Subsequently, the video data control section 205 conducts edge smoothing processing (step S1106), and effects pulse control (step S1107). Thereafter, the imaging unit 206 conducts image processing (step S1108).

Power saving control of the image processing device in the present invention will now be described in detail. As shown in FIG. 2, the image processing device of the present embodiment can be divided into a first function block section (the region A shown in FIG. 2) which must be continued in operation while a main power supply of the image processing device is in the on-state and a second function block section (the region B shown in FIG. 2) which can be stopped in operation even while the main power supply of the image processing device is in the on-state.

In order to accede to the power saving demand of the image processing device, the image processing device of the present embodiment has such a configuration that the first function block section for which the power cannot be disconnected at any cost is always supplied with power and the second function block section for which the power can be disconnected is supplied with power, except when the image processing device is not used for a long time as in the stand-by state. Thus the power dissipation is reduced as much as possible. The image processing device of the present embodiment can be restarted instantly by supplying power to the second function block section.

Figure 12:
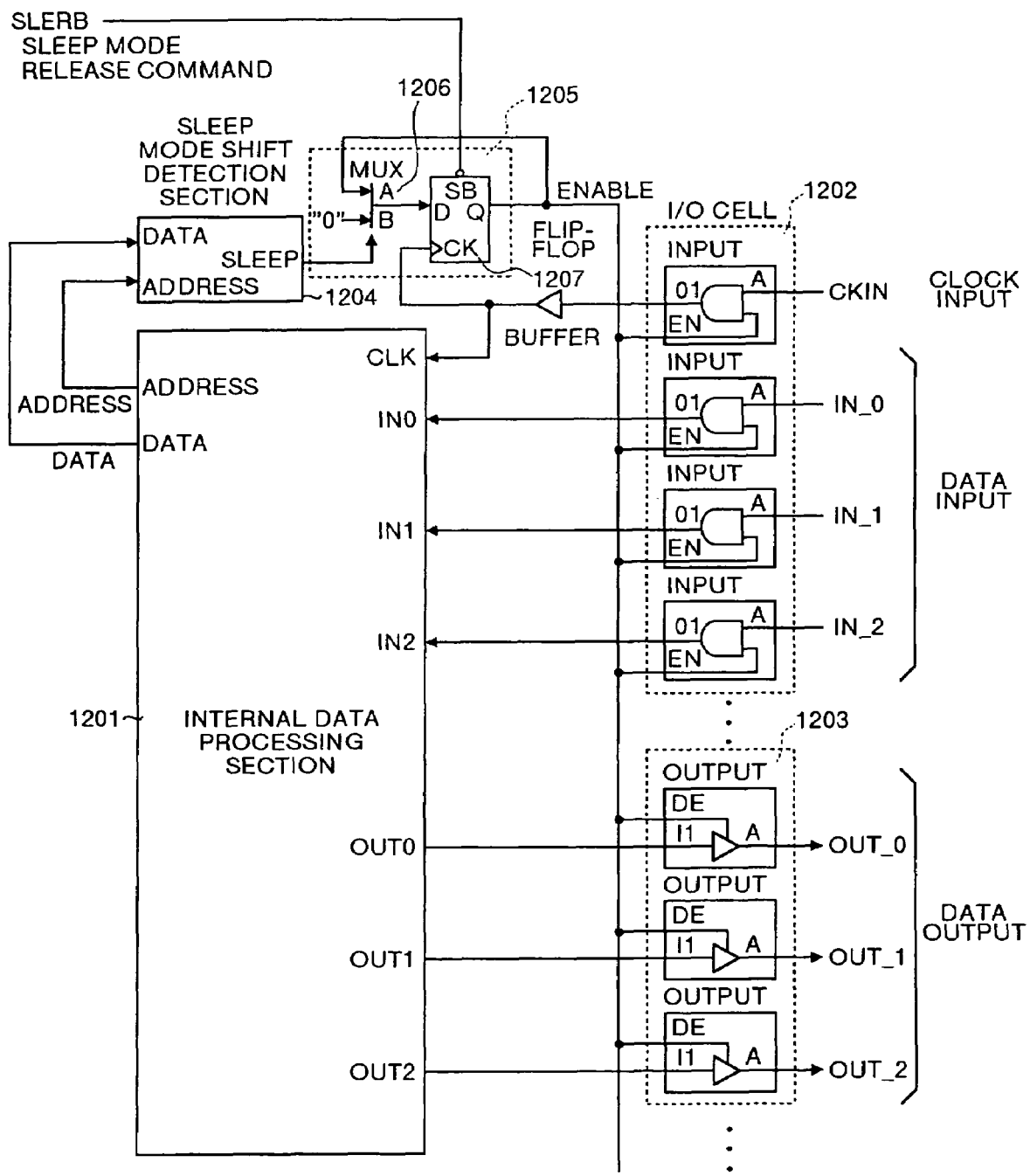
FIG. 12 is a block diagram of a power saving control unit provided in order to effect power saving control of an image processing device in an embodiment of the present invention.

FIG. 12 is a block diagram of a power saving control unit provided to effect power saving control on the image processing device of the present embodiment. The power saving control unit is provided in the image data control section 203 shown in FIG. 2. In the case where the image processing device is not used for a long time as in the stand-by state of the image processing device, the power saving control unit sets the image processing device to a sleep mode and disconnects supply of power to the second function block section existing in the region B shown in FIG. 2.

When restarting the use of the image processing device, the power saving control unit releases the image processing device from the sleep mode and supplies power to the second function block section existing in the region B again. Whether the image processing device is in the stand-by state or not, the first function block existing in the region A shown in FIG. 2 is always supplied with power.

As shown in FIG. 12, the power saving control unit includes an internal data processing section 1201 serving as a core for power saving control, an input section 1202 for disabling or enabling data input to the internal data processing section 1201, and an output section 1203 for disabling or enabling data output from the internal data processing section 1201.

In addition, the power saving control unit further includes a sleep mode shift detection section 1204 and a power control section 1205. When a sleep mode shift command (a command for setting the image processing device to a sleep mode) is inputted, the sleep mode shift detection section 1204 outputs a sleep command. If the sleep command is outputted from the sleep mode shift detection section 1204, then the power control section 1205 disconnects supply of power to the second function block section existing in the region B shown in FIG. 2, sets the input section 1202 to an input disabling state, and sets the output section 1203 to an output disabling state. On the other hand, if a sleep mode release command is outputted, then the power control section 1205 restarts supply of power to the second function block section existing in the region B shown in FIG. 2, sets the input section 1202 to an input enabling state, and sets the output section 1203 to an output enabling state.

Figure 13:
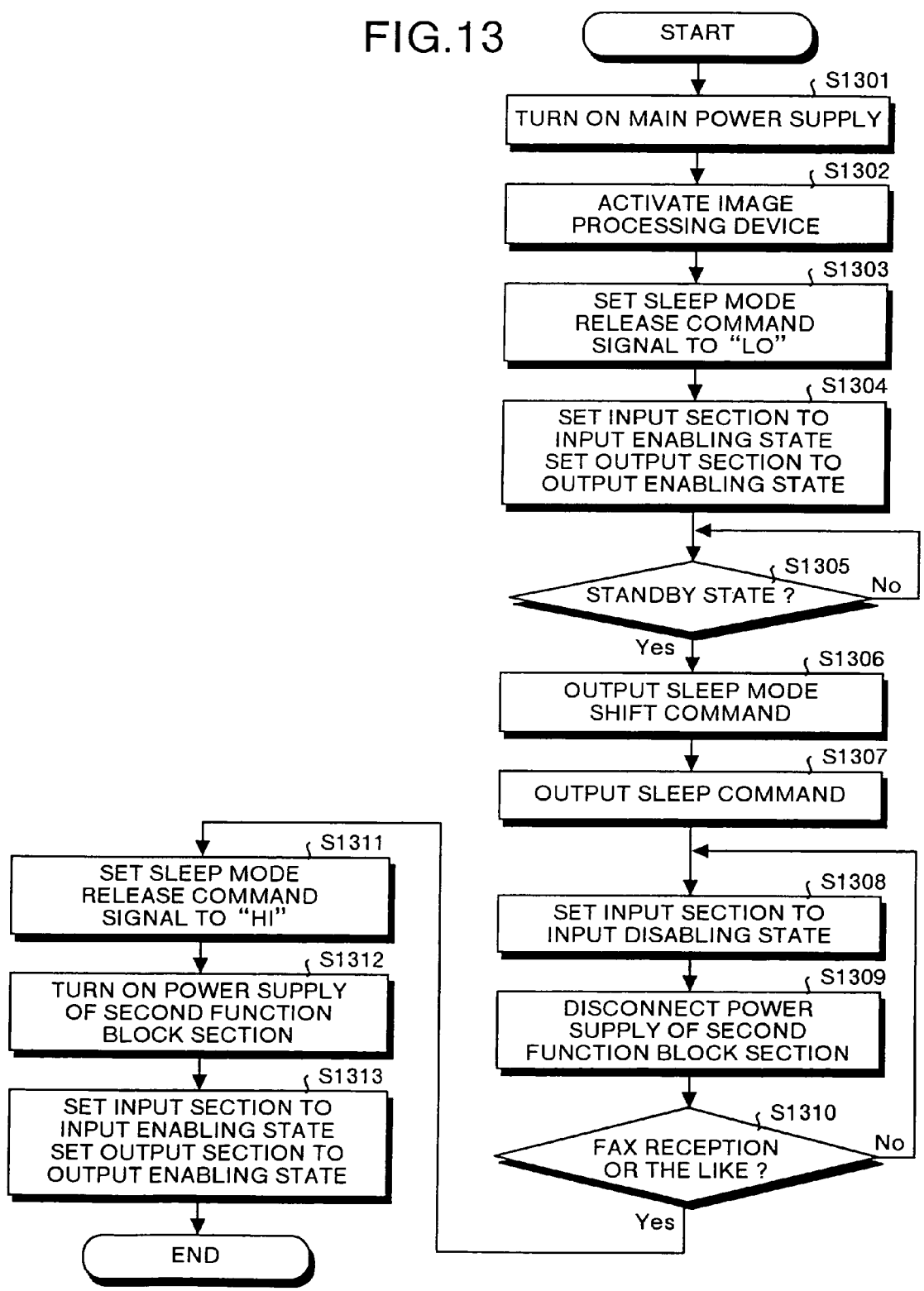
FIG. 13 is a flow chart showing processing of power saving control of an image processing device in an embodiment of the present invention.
Figure 14:
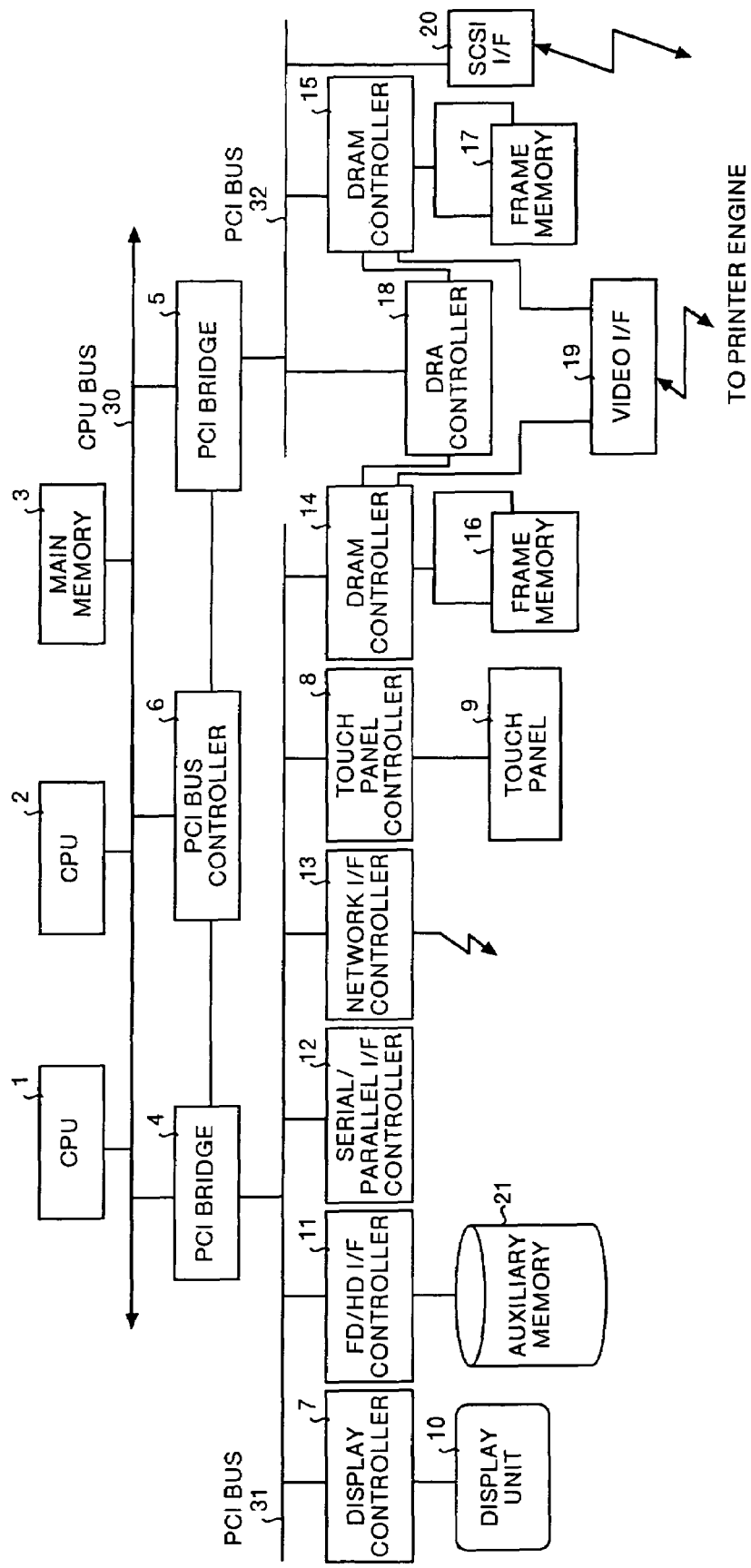
FIG. 14 is a block diagram showing the schematic configuration of a control system of a typical conventional digital copying machine.

Operation of the power saving control unit conducted when setting the image processing device of the present embodiment to the sleep mode will now be described with reference to the flow chart of FIG. 13.

First, a main power supply of the image processing device is turned on (step S1301). If operation of the image processing device is started (step S1302), then a sleep mode release command signal SLERB outputted from the system controller 231 shown in FIG. 2 is set to "LO" (step S1303).

If the sleep mode release command signal SLERB of "LO" is inputted to the power control section 1205, then an output signal ENABLE of the power control section 1205 is set to "HI", the input section 1202 is set to the input enabling state, and the output section 1203 is set to the output enabling state (step S1304).

When the output signal ENABLE of the power control section 1205 is set to "HI", the input section 1202 inputs external data to the internal data processing section 1201. When the output signal ENABLE of the power control section 1205 is set to "HI", the output section 1203 outputs data outputted from the internal data processing section 1201 to the outside. Normally, the image processing device operates in this state.

In the stand-by state of the image processing device, as in such a state that a copy or print command is not supplied to the MFP for at least a predetermined time (yes of step S1305), the sleep mode shift command is outputted from the process controller 211 (step S1306). The image data control section 203 inputs the sleep mode shift command via the serial bus 210, and transmits this command to the internal data processing section 1201 via the input section 1202 shown in FIG. 12.

Upon recognizing that the sleep mode shift command is inputted to the internal data processing section 1201, the sleep mode shift detection section 1204 outputs a sleep command toward the power control section 1205 (step S1307). Upon receiving the sleep command, the power control section 1205 changes "HI" to "LO" in its output signal ENABLE. When the sleep command is "HI", a multiplexer 1206 included in the power control section 1205 outputs "0" to a flip-flop 1207. Otherwise, the multiplexer 1206 holds the value of the flip-flop 1207.

If the output signal ENABLE is changed to "LO", then its change is recognized by the system controller 231 which manages the power supply of all function blocks, and the sleep mode is executed. In other words, the input section 1202 is set to the input disabling state, and the output section 1203 is set to the output disabling state (step S1308). Subsequently, supply of power to the second function block section existing in the region B shown in FIG. 2 is disconnected (step S1309).

To be concrete, supply of power to the process controller 211, the RAM 212, and the ROM 213 connected to the reading unit 201, the sensor board unit 202, the image processing processor 204, the video data control section 205, the imaging unit (engine) 206, and the serial bus 210 is disconnected by the system controller 231.

At this time, supply of power to the first function block section existing in the region A shown in FIG. 2 is not disconnected in order to cope with FAX reception conducted by the facsimile control unit 224 or accede to a copy request from the operation panel 234 and a print service request sent via the network.

If the output signal ENABLE has changed to "LO", then the input section 1202 is set to the input disabling state and the output section 1203 is set to the output disabling state, before disconnection of supply of power to the second function block section. In other words, if the output signal ENABLE of "LO" is inputted to the input section 1202, then a signal of "LO" is inputted to input terminals of AND circuits included in the input section 1202, and consequently data inputted from the outside are not transmitted to the internal data processing section 1201.

If the output signal ENABLE of "LO" is inputted to the output section 1203, then a signal of "LO" is inputted to circuits included in the output section 1203. Therefore, the circuits become high impedance states, and consequently it becomes impossible for the internal data processing section 1201 to output signals to the outside.

The reason why not only supply of power to the second function block section but also the input section 1202 is set to the input disconnection state and the output section 1203 is set to the output disconnection state will now be described. If supply of power to the second function block section is disconnected, then a signal of a "HI" state inputted to an input terminal of the image data control section 203 from the outside transits gradually to a "LO" state.

Each of blocks of the image data control section 203 is formed of a digital circuit using CMOS transistors or the like. If the input signal is between the "HI" state and the "LO" state for a long time, therefore, through currents may flow in CMOS transistors and devices may be destroyed.

If supply of power to the second function block section is disconnected, then a signal of the "HI" state outputted from an output terminal of the image data control section 203 to the outside flows into a terminal of the "LO" state of the second function block section, and a wasteful current flows.

When the image processing device is to be set to the sleep mode in order to avoid such inconvenience, the process controller 211 notifies the image data control section 203 of it beforehand. Upon receiving this notice, the image data control section 203 disconnects inputs of the input section 1202 and sets the output section 1203 to high impedance in order to prevent the above described overcurrent from flowing.

If the shift processing to the sleep mode in the image data control section 203 is thus completed, then the power control section 1205 changes "HI" to "LO" in output signal ENABLE. This change is recognized by the system controller 231, and supply of power to the second function block section existing in the region B shown in FIG. 2 is disconnected.

It is now assumed that the image processing device is in the sleep mode. If in this case FAX reception is conducted by the facsimile control unit 224, copy is ordered from the operation panel 234, or a print service request is supplied via the network (yes of step S1310), then the system controller 231 senses this.

The system controller 231 sets the sleep mode release signal SLERB to "HI" to effect release from the sleep mode (step S1311), and turns on power to the second function block section to restart supply of power (step S1312). In order to accede to a request of FAX reception, copy, printing, or the like immediately, the second function block section conducts initialization processing.

The image data control section 203 receives the sleep mode release command signal outputted from the system controller 231, and outputs this signal to the power control section 1205. If the sleep mode release command signal SLERB of "HI" is inputted to the power control section 1205, then the flip-flop 1207 inverts its output and consequently the output signal ENABLE of the power control section 1205 changes from "LO" to "HI."

As a result, the input section 1202 shifts from the input disabling state to the input enabling state, and the output section 1203 shifts from the output disabling state to the output enabling state (step S1313). Thus the image processing device is brought into such a state that normal processing is conducted. As a result, the requested service, such as FAX reception, copy, or printing, is executed.

Thus, the image processing device according to the present invention has such a configuration that at the standby time or the like of the image processing device, the function block section for which the power cannot be disconnected at any cost in order to respond to a request of, for example, FAX reception or copy, is supplied with power and disconnection of power supply for the remaining blocks is made possible. As a result, maximum possible energy saving can be implemented. On the other hand, when a request of FAX reception or copy is received, it is possible to restart the image processing device rapidly and accede to the request.

Furthermore, at the time of shift to the sleep mode in the image processing device according to the present invention, function blocks which have received a notice to that effect from the outside are set to the input disabling state. Even if a signal from an external function block connected to the function block transits slowly from "HI" to LO", therefore, the transition state of the signal is not conveyed to the inside of the function block, and consequently the overcurrent can be prevented from flowing. Furthermore, since the function block is set to the output disabling state as well, current flow out to the outside can also be prevented.

The method for saving a power consumption of the image processing device described with reference to the present embodiment is implemented by executing a program prepared beforehand on a computer such as a personal computer or a work station. This program is recorded on a computer readable recording medium such as a hard disk, a floppy disk, a CD-ROM, a MO, or a DVD, read out from the recording medium, and executed. Furthermore, this program can be distributed via the recording medium, or via a network such as Internet as a transmission medium.

According to the first aspect of the present invention, supply of power is disconnected to the second function block section if the sleep mode setting command of the second function block section is inputted to the sleep mode setting command input unit and the sleep mode setting command from the sleep mode setting command input unit is inputted to the power control unit. Therefore, the power dissipation of such second function block sections that power supply disconnection of them does not affect the operation of the image processing device can be reduced. This brings about an effect that the demand of energy saving which is the need of the time can be acceded.

Further, supply of power to the second function block section is restarted when the sleep mode release command is inputted by the sleep mode release command input unit and the sleep mode release command from the sleep mode release command input unit is inputted into the power control unit. Therefore, power is supplied again to the second function block section whose power supply was disconnected. Accordingly, it becomes possible to restart the image processing device immediately. This brings about an effect that the user's use request can be coped with rapidly.

Further, the power control unit sets the data input unit to the input disabling state and sets the data output unit to the output disabling state, when the sleep mode setting command from the sleep mode setting command input unit is inputted into the power control unit. This brings about an effect that the second function block section is not affected by a signal inputted thereto, and the second function block section can prevent outflow of a current therefrom. As a result, the internal circuit of the second function block section can be protected positively.

Further, the power control unit sets the data input unit to the input enabling state and sets the data output unit to the output enabling state, when the sleep mode release command is outputted from the sleep mode release command input unit. Accordingly, it becomes possible to restart the image processing device immediately. This brings about an effect that the user's use request can be coped with rapidly.

According to the method for saving a power consumption of another aspect of the present invention, the sleep mode setting command of the second function block section is inputted at the sleep mode setting command input step, and supply of power to the second function block section is disconnected at the power control step when the sleep mode setting command is inputted at the sleep mode setting command input step. Therefore, the power dissipation of such second function block sections that power supply disconnection of them does not affect the operation of the image processing device can be reduced. This brings about an effect that the demand of energy saving which is the need of the time can be acceded.

Further, the input output control step disables input to the second function block section and disables output from the second function block section, when the sleep mode setting command is inputted at the sleep mode setting command input step. This brings about an effect that the second function block section is not affected by a signal inputted thereto, and the second function block section can prevent outflow of a current therefrom. As a result, the internal circuit of the second function block section can be protected positively.

Further, the sleep mode release command input step outputs a sleep mode release command for supplying power to the second function block section again. Therefore, power is supplied again to the second function block section disconnected in power supply. Accordingly, the image processing device can be restarted immediately. This brings about an effect that it is possible to cope with a user's use request rapidly.

According to an eighth aspect of the present invention, a program for making a computer execute the method according to the present invention is recorded. Therefore, it becomes possible for a machine to read the program. This brings about an effect that operations of the fifth to seventh aspects can be implemented by a computer.

The present document incorporates by reference the entire contents of Japanese priority documents, 11-327494 filed in Japan on Nov. 17, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data processing device comprising:
a function block section comprising a plurality of blocks configured to perform various processings, the plurality of blocks including a first block that receives an input from an external source and a second block that is subject to operation in a power saving mode;
said second block having output devices in communication with respective units in the second block; and
a power control unit configured to continue a supply of power to the first block while the second block is in the power saving mode and prior to entry into the power saving mode to set a high impedance state for the output devices.

2. The data processing device according to claim 1, wherein the power control unit is configured to continue the supply of power to the first block while a main power supply is on.

3. The data processing device according to claim 1, wherein the first block comprises any one of a facsimile control block and a block that receives an input from an external computer device or an operation panel as the external source.

4. The data processing device according to claim 1, further comprising a setting command input unit configured to input a sleep mode setting command to set the data processing device to the power saving mode.

5. The data processing device according to claim 1, wherein the power control unit is further configured to disconnect the supply of power to the second block when the data processing device is set to the power saving mode.

6. The data processing device according to claim 5, further comprising:
a sleep mode release command input unit configured to input a sleep mode release command to release the data processing device from the power saving mode, wherein the power control unit restarts the supply of power to the second block when the sleep mode release command is input by the sleep mode release command input unit.

7. The data processing device according to claim 4, wherein the function block section further comprises a data input unit configured to input various data and a data output unit configured to output various data, and wherein said power control unit sets the data input unit to an input disable state and sets the data output unit to an output disable state when the sleep mode setting command is input from the sleep mode setting command input unit.

8. The data processing device according to claim 7, wherein the power control unit further sets the data input unit to an input enable state and sets the data output unit to an output enable state when the sleep mode release command is input from the sleep mode release command input unit.

9. A method for saving a power consumption of a data processing device, the method comprising:
providing a function block section including a plurality of function blocks to perform various processings, the plurality of blocks including a first block that receives an input from an external source and a second block that is subject to operation in a power saving mode, said second block having output devices in communication with respective units in the second block;
providing a power control unit configured to continue a supply of power to the first block while the second block is in the power saving mode; and
prior to entry into the power saving mode, setting a high impedance state for the output devices to prevent current flow from the second block on entry into the power saving mode.

10. The method according to claim 9, wherein the providing a power control unit further comprises continuing the supply of power to the first block while a main power supply is on.

11. The method according to claim 9, wherein the first block includes any one of a facsimile control block and a block that receives an input from an external computer device or an operation panel as the external source.

12. The method according to claim 9, further comprising:
inputting a sleep mode setting command to set the data processing device to the power saving mode.

13. The method according to claim 9, wherein the providing a power control unit further comprises disconnecting the supply of power to the second block when the data processing device is set to the power saving mode.

14. The method according to claim 13, further comprising:
inputting a sleep mode release command to release the data processing device from the power saving mode; and
restarting the supply of power to the second block when the sleep mode release command is input.

15. The method according to claim 13, further comprising:
inputting various data and outputting various data; and
disabling an input to the second block and disabling an output from the second block when the sleep mode setting command is input at the inputting the sleep mode setting command.

16. The method according to claim 15, further comprising:
inputting a sleep mode release command for releasing the image processing device from the power saving mode, restarting the supply of power to the second block when the sleep mode release command is input at the inputting the sleep mode release command.

17. A computer readable medium storing instructions, which when executed by a computer, causes the computer to perform, on an image processing device that includes a function block section including a plurality of blocks to perform various processings, the plurality of blocks including a first block that receives an input from an external source and a second block that is subject to operation in a power saving mode, said second block having output devices in communication with respective units in the second block, the instructions causing the computer to perform:

continuing supply of power to the first block section while the second block is in the power saving mode; and prior to entry into the power saving mode, setting a high impedance state for the output devices to prevent current flow from the second block on entry into the power saving mode.

18. The computer readable medium according to claim 17, wherein the continuing the supply of power is performed while a main power supply of the image processing device is on.

19. The computer readable medium according to claim 17, wherein the first block includes any one of a facsimile control block and a block that receives an input from an external computer device or an operation panel as the external source.

20. The computer readable medium according to claim 17, further comprising:

inputting a sleep mode setting command to set the data processing device to the power saving mode.

21. The computer readable medium according to claim 17, wherein the supply of power to the second block is disconnected when the data processing device is set to the power saving mode.

22. The computer readable medium according to claim 21, further comprising:

inputting a sleep mode release command to release the data processing device from the power saving mode; and restarting the supply of power to the second block when the sleep mode release command is input.

23. The computer readable medium according to claim 21, further comprising:

inputting various data and outputting various data; and disabling an input to the second block and disabling an output from the second block when the sleep mode setting command is input at the sleep mode setting command input.

24. The computer readable medium according to claim 23, further comprising:

inputting a sleep mode release command for releasing the image processing device from the power saving mode; and.

restarting the supply of power to the second block when the sleep mode release command is input at the inputting the sleep mode release command.

* * * * *